(12) United States Patent
Alexanian et al.

(10) Patent No.: US 11,171,399 B2
(45) Date of Patent: Nov. 9, 2021

(54) MEANDERING WAVEGUIDE RIDGES AND RELATED SENSOR ASSEMBLIES

(71) Applicant: VEONEER US, INC., Southfield, MI (US)

(72) Inventors: Angelos Alexanian, Lexington, MA (US); Konstantinos Konstantinidis, Wurzburg (DE)

(73) Assignee: Veoneer US, Inc., Southfield, MI (US)

( * ) Notice: Subject to any disclaimer, the term of this patent is extended or adjusted under 35 U.S.C. 154(b) by 177 days.

(21) Appl. No.: 16/520,266

(22) Filed: Jul. 23, 2019

(65) Prior Publication Data

US 2021/0028528 A1 Jan. 28, 2021

(51) Int. Cl.
*H01P 3/123* (2006.01)
*G01S 3/40* (2006.01)
*G02B 6/42* (2006.01)

(52) U.S. Cl.
CPC .............. *H01P 3/123* (2013.01); *G01S 3/40* (2013.01); *G02B 6/4287* (2013.01)

(58) Field of Classification Search
CPC ......... H01P 3/123; G01S 3/40; G02B 6/4287; H01Q 21/0043; H01Q 1/3233
USPC .................. 333/236, 239, 245, 248, 252
See application file for complete search history.

(56) References Cited

U.S. PATENT DOCUMENTS

| | | | |
|---|---|---|---|
| 7,132,905 B2 | 11/2006 | Sano | |
| 8,779,995 B2 | 7/2014 | Kirino et al. | |
| 8,803,638 B2 | 8/2014 | Kildal | |
| 9,153,851 B2 | 10/2015 | Nakamura | |
| 9,252,475 B2 | 2/2016 | Milyakh et al. | |
| 9,666,931 B2 | 5/2017 | Suzuki | |
| 10,164,344 B2 | 12/2018 | Kirino et al. | |
| 2011/0050356 A1 | 3/2011 | Nakamura et al. | |
| 2017/0187121 A1 | 6/2017 | Kirino et al. | |
| 2017/0187124 A1* | 6/2017 | Kirino | H01Q 1/3266 |

(Continued)

FOREIGN PATENT DOCUMENTS

| | | |
|---|---|---|
| CN | 102931492 | 2/2015 |
| CN | 106207357 | 12/2016 |
| WO | 2018001921 | 1/2018 |

OTHER PUBLICATIONS

CN102931492, Feb. 11, 2015, Beijing Institute of Telemetry Technology, Machine Translation (9 pages).

(Continued)

*Primary Examiner* — Robert J Pascal
*Assistant Examiner* — Jorge L Salazar, Jr.
(74) *Attorney, Agent, or Firm* — Matthew D. Thayne; Thayne and Davis LLC

(57) ABSTRACT

Antenna assemblies for vehicles, such as RADAR sensor antenna assemblies, and related waveguide assemblies. In some embodiments, the assembly may comprise a waveguide groove having a waveguide ridge positioned therein. The waveguide groove may extend along an axis with the waveguide ridge intermittently extending on opposite sides of the axis in a periodic or at least quasiperiodic manner along at least a portion of the waveguide ridge. An antenna structure, such as a plurality of slots, may be operably coupled with the waveguide ridge and may be positioned and configured to deliver electromagnetic radiation from the waveguide groove therethrough.

20 Claims, 6 Drawing Sheets

(56) References Cited

U.S. PATENT DOCUMENTS

2018/0351261 A1  12/2018  Kamo et al.
2018/0375219 A1  12/2018  Kirino et al.

OTHER PUBLICATIONS

CN106207357, Dec. 7, 2017, Chengdu Xanaway Technology Co., Ltd., Machine Translation (58 pages).
Oct. 15, 2020, PCT/US20/042832, International Search Report, (3 pages).
Oct. 15, 2020, PCT/US20/042832, Written Opinion, (7 pages).

* cited by examiner

MEANDERING WAVEGUIDE RIDGES AND RELATED SENSOR ASSEMBLIES

SUMMARY

Disclosed herein are various embodiments of waveguide and/or antenna structures that may be used in connection with various electrical devices comprising electromagnetic waveguides, such as RADAR sensor modules for vehicles. Some of the waveguide structures disclosed herein may be configured to improve upon limitations to the gain and/or bandwidth product associated with other antenna structures utilizing ridge-type waveguides. Thus, in some embodiments, instead of having a typical waveguide ridge that extends in a straight line, waveguide ridges may be formed that bend, curve, stagger, or otherwise meander, preferably from one side of a waveguide groove to the other in a repeating pattern along the length of the waveguide groove.

In a more particular example of an antenna module according to some embodiments, the module may comprise one or more waveguide grooves, one or more of which may comprise a waveguide ridge positioned therein. The waveguide groove(s) may comprise an elongated axis that may extend perpendicular, or at least substantially perpendicular, to the direction between opposing sides defining the waveguide groove(s), which may comprise, for example, posts and/or sidewalls. In some embodiments, the waveguide ridge(s) may intermittently extend on opposite sides of the elongated axis in a periodic or at least quasiperiodic manner along at least a portion of the waveguide ridge(s). The module may further comprise an antenna structure operably coupled with the waveguide ridge, which may be positioned and configured to deliver electromagnetic radiation from the waveguide groove therethrough. In some embodiments, the antenna structure is configured in a periodic or at least quasiperiodic manner that is correlated with the waveguide ridge.

In some embodiments, the antenna structure may comprise a plurality of slots, which slots may be formed in the same structure, such as a casting structure or other antenna block, within which the waveguide groove(s) are formed, or may be formed in a separate structure, such as a slotted layer coupled to the casting/block structure. The slots may extend along and/or adjacent to the waveguide in a periodic or quasiperiodic manner that is correlated with that of the waveguide ridge by extending towards, away from, and/or along respective sides of the waveguide groove opposite the waveguide ridge. In preferred embodiments, one or more (each in some embodiments) of the slots may be at least partially or fully aligned with an empty portion of the waveguide groove (e.g., no ridge is in the space exposed by the slots).

For example, in some embodiments, the waveguide ridge may extend, at least in part, on opposite sides of the axis of the waveguide ridge along straight lines that are at least substantially parallel to the axis in a cycle having a phase/period. Similarly, at least a subset of the plurality of slots may extend, at least in part, along opposite sides of the elongated axis along straight lines that are at least substantially parallel to the axis in a cycle having a phase/period. The phase/period of the plurality of slots may be opposite from the phase/period of the waveguide ridge such that each of the plurality (or subset of the plurality) of slots is misaligned with an adjacent portion of the waveguide ridge within the waveguide groove(s) and/or such that one or more (in some embodiments, each) of the slots defines a path into an open part of the waveguide groove rather than intersecting the waveguide ridge. The waveguide ridge(s) may comprise portions extending back and forth across the waveguide groove(s) coupling the portions extending parallel or at least substantially parallel to the axis forming a square wave or square wave-like pattern or, alternatively, the waveguide ridge(s) may comprise separated ridge portions extending along opposing sides of the waveguide groove(s).

In other embodiments, the waveguide ridge and/or the slots may extend, at least in part, on opposite sides of the elongated axis in an at least substantially sinusoidal pattern or, alternatively, along lines that intersect and form acute angles relative to the elongated axis and form periodic sharp peaks on opposite sides of the elongated axis, such as in a sawtooth or sawtooth-like pattern.

In another example of an antenna module according to other embodiments, the module may comprise an antenna block defining a waveguide groove on a first side of the antenna block, The waveguide groove may have a length extending along an axis of the waveguide groove and a width defined between opposing waveguide groove structures positioned on a first side of the waveguide groove and a second side of the waveguide groove opposite the first side. The opposing waveguide groove structures may comprise, for example, one or more rows of posts, which may be spaced apart from one another to form gaps therebetween or may be positioned immediately adjacent one another without such spacing.

The antenna module may further comprise a waveguide ridge extending within the waveguide groove in a cyclic pattern, or an at least substantially cyclic pattern, having a series of repeated periods/phases. A plurality of antenna slots may be positioned adjacent to the waveguide ridge, such as either in a separate layer or in the same structure as the waveguide ridge, and may be configured to deliver electromagnetic radiation from the waveguide ridge therethrough, The plurality of antenna slots may be formed in a cyclic pattern having a series of repeated periods/phases. The series of repeated periods/phases of the plurality of antenna slots may be shifted relative to the series of repeated periods/phases of the waveguide ridge. For example, in some embodiments, the series of repeated periods/phases of the plurality of antenna slots may be opposite the series of repeated periods/phases of the waveguide ridge.

In some embodiments, the opposing waveguide groove structures may comprise a plurality of spaced posts aligned in rows positioned opposite from one another. In some such embodiments, multiple rows of such posts may extend on both sides of the waveguide groove.

In some embodiments, the series of repeated periods/phases of the plurality of antenna slots may be shifted relative to the series of repeated periods/phases of the waveguide ridge such that portions of the waveguide ridge having a maximum distance from a center of the waveguide groove towards the first side of the waveguide groove extend adjacent to portions of the plurality of antenna slots having a maximum distance from the center of the waveguide groove towards the second side of the waveguide groove. In some such embodiments, each of the plurality of antenna slots may be aligned with a portion of the waveguide groove and each of the adjacent portions of the waveguide ridge may be positioned to maximize a distance between each respective pair of antenna slot and adjacent waveguide ridge within each of the repeated periods/phases in a direction at least substantially perpendicular to a direction in which the antenna slots and adjacent waveguide ridge extend, at least in part. Of course, in some embodiments, one or more of the slots may be offset towards or away from the ridge, which may create another degree of freedom. For example, in some embodiments, one slot, or a pair of slots, may be shifted in one direction with respect to the ridge and/or groove and an adjacent slot or pair of slots may be shifted in the opposite direction, which may continue along the entire waveguide groove if desired.

In some embodiments, the waveguide ridge may extend, at least in part, in sinusoidal or an at least substantially sinusoidal cyclic pattern—which may include a series of repeating U-shapes, for example—a square-wave or at least substantially square-wave-like pattern, or a sawtooth or at least substantially sawtooth-like pattern.

In some embodiments, one or more (in some cases, each) of the plurality of antenna slots may be formed, or at least partially formed, adjacent to an opposite side of the waveguide groove relative to an adjacent peak of the sinusoidal, sawtooth, or other cyclic pattern having such peaks.

In some embodiments, one or more (in some cases, each) of the at least a subset of the plurality of antenna slots may be curved. In some such embodiments, each of the at least a subset of the plurality of antenna slots may be curved in an opposite direction relative to an adjacent portion of the waveguide ridge such that each of the at least a subset of the plurality of antenna slots forms, at least in part, one or more of the aforementioned patterns, such as an at least substantially sinusoidal cyclic pattern, that is opposite or shifted by 180 degrees relative to the corresponding cyclic or other pattern, such as an at least substantially sinusoidal cyclic pattern, of the waveguide ridge.

In still another example of an antenna module according to some embodiments, the module may comprise an antenna block comprising a waveguide groove defined by opposing rows of posts. In some embodiments, multiple rows of such posts may extend on both sides of the waveguide groove defined therebetween. A waveguide ridge may extend within the waveguide groove in a cyclic pattern having a series of repeated periods/phases. A slotted layer may be coupled to the antenna block and may comprise a plurality of antenna slots positioned adjacent to the waveguide groove, such as extending along the waveguide groove in a cyclic pattern. Alternatively, the slotted layer may comprise a series of spaced slots aligned with one another in a straight, or at least substantially straight, line.

The cyclic pattern may have a series of repeated periods/phases. In preferred embodiments, each of the repeated periods/phases of the plurality of antenna slots is shifted, such as preferably opposite or 180 degrees out of phase with respect to the adjacent repeated periods/phases of the waveguide ridge. In some embodiments, this may be done so as to maximize a distance between each antenna slot of the plurality of antenna slots and an adjacent portion of the waveguide ridge within each of the repeated periods/phases of the waveguide ridge in a direction perpendicular to an axis of the waveguide ridge, as measured within a plane of the slotted layer (even though the slotted layer may not be in the same plane as the waveguide groove).

In some embodiments, the waveguide ridge may be continuous. In other words, in embodiments comprising a waveguide ridge in a square wave or square wave-like pattern for example, the ridge may extend back and forth across the waveguide groove in this pattern without intermittent breaks in the waveguide ridge. In other embodiments, one or more breaks or gaps may be present between adjacent waveguide ridge sections or portions of the waveguide ridge. It may be preferred in such embodiments, however, to keep the gaps/breaks between adjacent sections relatively small to avoid disruptions to the propagation of electromagnetic energy.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
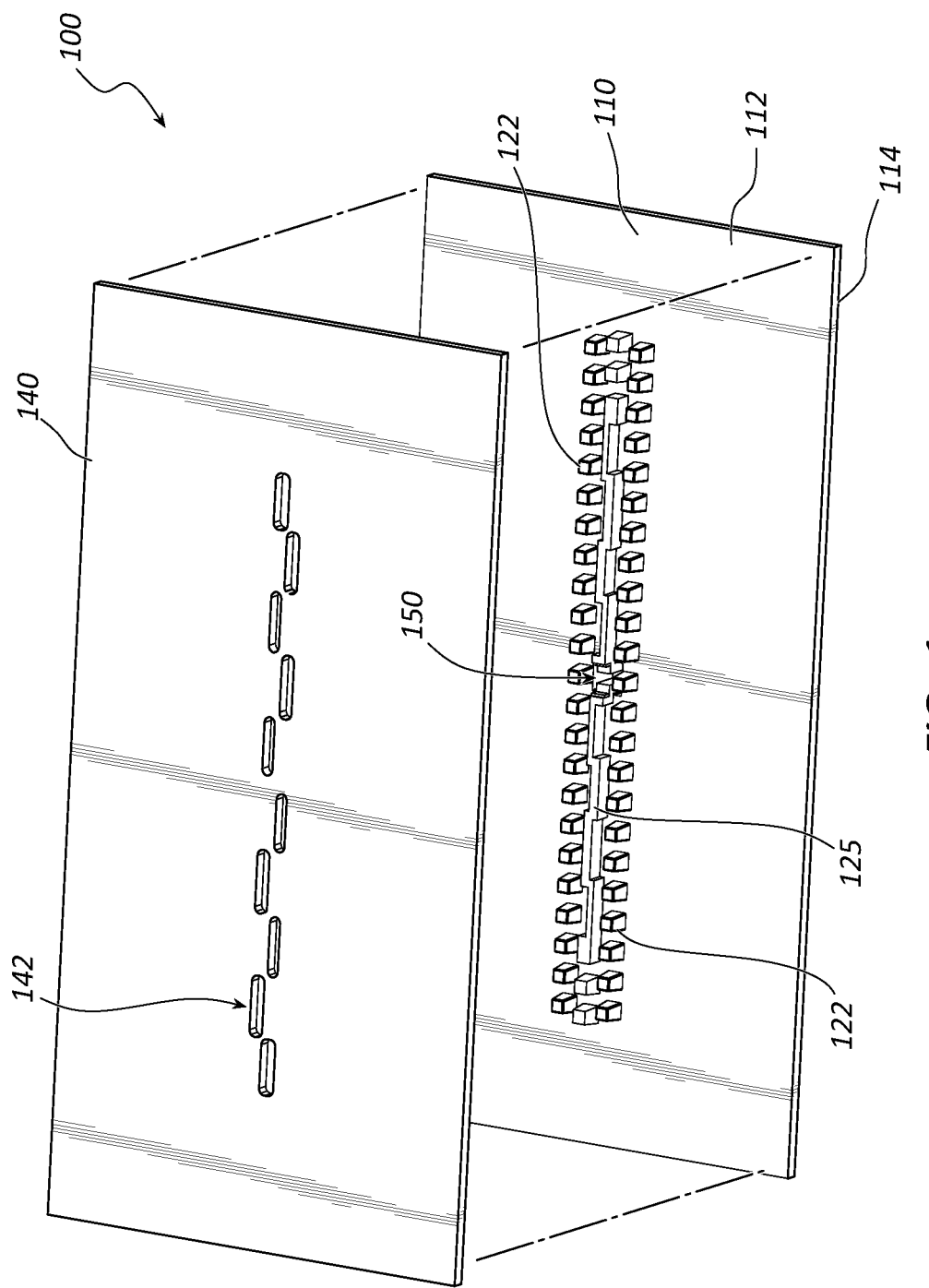
FIG. 1 is an exploded, perspective view of a waveguide assembly that may be used in, for example, a RADAR or other electromagnetic sensor, according to some embodiments.

FIG. 1 depicts an antenna assembly 100 that may be incorporated into or otherwise used with a vehicle sensor, such as a RADAR sensor assembly, or any other desired sensor or other assembly utilizing electromagnetic waveguides, according to some embodiments. Antenna assembly 100 comprises an antenna block 110 that defines, either in whole or in part, one or more waveguides as part of an antenna array comprising one or more antennae, on one or both sides of antenna block 110. Thus, as depicted in FIG. 1, antenna block 110 comprises a plurality of posts 122 arranged in opposing rows on a first side 112 of antenna block 110 to define a waveguide groove therebetween.

It should be understood that although, in preferred embodiments, any number of antennae may be provided and therefore any desired number of corresponding antennae structures—such as a plurality of waveguides, grooves, etc.—may be provided, it is contemplated that some embodiments may comprise an array having a single antenna and therefore only a single waveguide, for example. Such antenna/waveguide/groove may curve about the block/assembly rather than be in a series of parallel lines in some embodiments. As another example, in some embodiments, grooves, slots, or the like may be arranged in a disc formation, or any other suitable formation, including linear, curved, etc. In addition, although the waveguide grooves in the depicted embodiment are defined by rows of posts, it should also be understood that waveguides may be defined in alternative ways in other embodiments, such as by forming a groove within a solid structure (i.e., no posts extending up from the structure), or in any other suitable manner available to those of ordinary skill in the art.

In preferred embodiments, antenna block 110 may comprise a casting, such as a casting comprising a Zinc or other suitable preferably metal material. However, in other contemplated embodiments, block 110 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with block/casting 110.

For example, in the depicted embodiment, a slotted layer 140 comprising a plurality of slots 142 may be coupled to the antenna block 110, in some cases along with other layers and/or elements that are not depicted herein to avoid obscuring the disclosure, to form antenna assembly 100. In other embodiments, electromagnetic radiation may be emitted using other slots or openings not formed in a separate layer. For example, in some embodiments, slots may be formed in antenna block 110 itself in alternative embodiments. In some such embodiments, slots may be formed at or adjacent to the ridge, which may be staggered from one side of the waveguide groove to the other, as mentioned elsewhere in this disclosure.

Slotted layer 140 of antenna assembly 100 may comprise one or more rows of slots 142, which may correspond in number and/or location with the antennae partially defined by antenna block 110. As also shown in FIG. 1, which only depicts a single row of slots for simplicity, one or more of the rows of slots 142 may be staggered with respect to one another. As discussed below, in some embodiments, this staggering configuration may be such that each slot 142 extends along a side of a waveguide groove defined by posts 122, in some such embodiments along a ridge 125 extending within the waveguide groove, and such that each slot 142 extends along an opposite side of the groove and/or ridge 125 relative to its adjacent slot 142 to facilitate a desired guidance of RF or other electromagnetic radiation though slots 142. However, those of ordinary skill in the art will appreciate that a wide variety of alternative configurations are possible depending upon the desired functionality and specifications of the waveguide/sensor assembly.

Preferably, slotted layer 140 comprises a metal or other conductive material. Layer 140 may be coupled with block 110 in a variety of possible ways. For example, an adhesive, solder, heat stakes, screws, other fasteners, and the like may be used to couple layer 140 to block 110. In some embodiments, as discussed below, another layer, such as a layer of adhesive tape, may be inserted in between layers 110 and 140, which may, either entirely or in part, be used to provide this coupling. In embodiments in which solder is used, such solder may be applied to the top of one or more (in some embodiments, all) of posts 122 and/or ridges 125 (if present).

As shown in FIG. 1, a ridge 125 is positioned within the waveguide grooves defined by the opposing rows of posts 122. Although a single row of posts 122 is positioned on each side of ridge 125 in the depicted embodiment, other embodiments are contemplated in which two rows, or more than two rows, of such posts may be positioned on either side of ridge 125 or any of the other ridges disclosed herein.

Electromagnetic radiation may travel within the waveguides defined by the aforementioned posts 122 and/or ridges 125 and may be transmitted through the various slots 142 formed in block 110. Ridges 125 may be preferred to enhance the characteristics of the waveguide by further facilitating guidance of electromagnetic waves as desired and/or for satisfying size/dimensional demands.

As also shown in FIG. 1, ridge 125 is not straight. Instead, ridge 125 "meanders" back and forth from one side of the waveguide groove defined by posts 122 and the other. Without being limited by theory, the present inventors believe that providing this feature, or any of the variations of this feature disclosed herein, may facilitate better travel/coupling of electromagnetic radiation and/or fields along ridge 125 and/or couple the energy more efficiently to the adjacent slots 142. Thus, with appropriate design, including placement of slots, meandering ridges, and the like, unwanted reflections from slots may be eliminated or at least reduce to provide a more efficient radiation mechanism.

The contribution of this technique may be twofold. First, proper design of the ridge 125 may allow electric field distribution along the ridge 125 to couple more effectively and/or efficiently with the source of electromagnetic waves and therefore overcome limits to the gain (with low side lobe level) and/or matching bandwidth product that may otherwise be imposed by the use of gap waveguide structures such as the posts 122 shown in the depicted embodiment. This may be interpreted as either providing more bandwidth for fixed gain, more gain for a fixed bandwidth, or both, thereby offering an advantageous design flexibility.

As another potential benefit, providing a meandering ridge may introduce a phase delay in the transmission line without increasing the total effective length of the ridge and thereby reduce the overall required antenna length. Although some of these benefits are thought to be most applicable to gap waveguide structures, it is also contemplated that, as discussed below, use of meandering ridge waveguide antenna structures may also be applicable for use in more conventional parallel-plate type waveguide structures and other gapless (such as incorporating posts without intervening gaps) waveguide configurations.

Although several of the embodiments disclosed herein the slots meander or extend in a periodic or quasiperiodic manner opposite from the adjacent ridge portions, in other embodiments, the waveguide structure may comprise a meandering ridge and a series of aligned slots. This configuration may be useful for widening the azimuth radiation pattern. When a straight ridge is used, it may be preferred for the slots to alternate back and forth so that they all radiate in phase. However, by meandering the ridge, as proposed herein, in some embodiments, the slots may be aligned rather than alternate/meander their position and achieve the same result, as shown and described in connection with FIG. 7. If all the slots are aligned, it is expected that this could give the broadest azimuth pattern, since when slots are displaced laterally the azimuth pattern typically shrinks and/or becomes more directive.

One or more of these benefits may be achieved and/or enhanced by staggering the slots 142 to maximize or at least increase their respective distances in a direction perpendicular to the axis of the waveguide groove and/or between opposing sides of the waveguide groove from an adjacent portion of the meandering ridge 125. In other words, the waveguide groove comprises an elongated axis and waveguide ridge 125 intermittently extends on opposite sides of the elongated axis in a periodic or quasi-periodic manner. Moreover, antenna slots 142 also intermittently extend on opposite sides of the waveguide groove in a periodic or quasi-periodic manner. More particularly, as ridge 125 extends along one side of the waveguide groove, the adjacent slot 142 extends along the opposite side of the groove so that the space in between each slot 142 and its adjacent waveguide ridge portion (in a direction normal to the axis of the waveguide groove) is maximized, or at least substantially maximized. Although the antenna slots 142 are formed in a separate layer in the embodiment of FIGS. 1 and 2, in alternative embodiments these slots may be formed in the same structure—i.e., block 110 in the case of the depicted embodiment—in which case the ridge and slots may still meander in a periodic or quasi-periodic manner as previously discussed.

Figure 2:
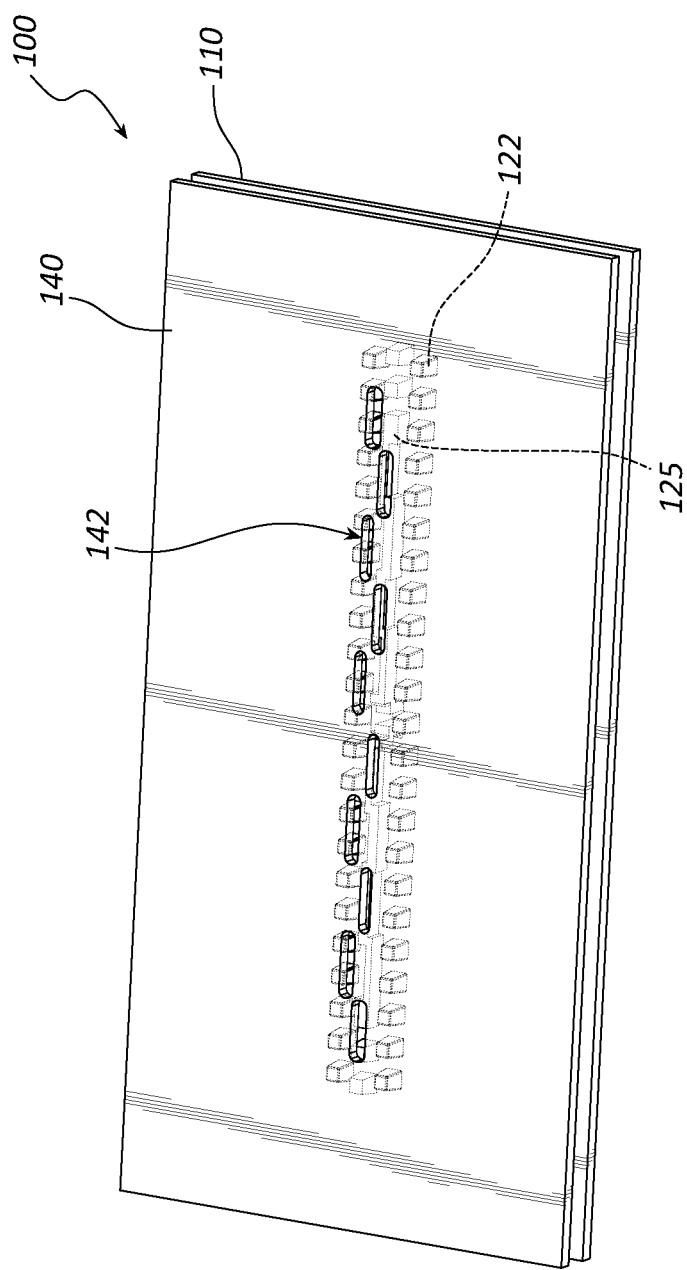
FIG. 2 is a perspective view of the assembly of FIG. 1 with the waveguide structures of the assembly shown in phantom.

In the embodiment of FIGS. 1 and 2, waveguide ridge 125 extends, at least in part, on opposite sides of the elongated axis along straight lines that are at least substantially parallel to the elongated axis in a cycle having a repeated period or phase. In addition, the waveguide ridge 125 extends continuously in that the portions connecting the parallel straight-line portions extend perpendicular to the elongated axis such that the waveguide ridge 125 extends in a square-wave pattern within the waveguide groove. Otherwise stated, waveguide ridge 125 extends, at least in part, on opposite sides of the elongated axis of the waveguide groove along lines that intersect and form acute angles relative to the elongated axis and form periodic sharp peaks on opposite sides of the elongated axis to connect the portions extending parallel, or at least substantially parallel to, the axis of the waveguide groove.

However, as discussed below, alternative embodiments are contemplated in which the waveguide ridge 125, like slots 142, may comprise disconnected portions. Similarly, in alternative embodiments, each slot 142 may be connected to its adjacent slots rather than discrete and physically disconnected as shown in FIGS. 1 and 2.

Similar to the waveguide ridge 125, the plurality of slots 142 extends, at least in part, along opposite sides of the elongated axis of the waveguide groove along straight lines that are at least substantially parallel to the elongated axis, also in a cycle having a repeated period or phase. This period/phase is opposite that of the waveguide ridge 125 such that each of the plurality of slots 142 is misaligned with at least a portion (in some such embodiments, all) of an adjacent portion of the waveguide ridge 125. In other words, whether slots 142 are formed in the same structure or, as shown in FIGS. 1 and 2, a separate layer 140 or other structure, it may be preferred that each slot 142 is aligned with a portion of the groove that does not include the adjacent waveguide ridge 125. In the depicted embodiment, this misalignment is such that no portion of an adjacent waveguide ridge 125 is aligned with the adjacent slot 142 but it is contemplated that in other embodiments some portion of one or more of the waveguide ridges 142 may overlap with its adjacent slot 142. Again, however, preferably at least the center axis of each slot is not aligned with the center axis of its adjacent ridge/ridge portion.

Although the periods/phases of the waveguide ridge 125 are opposite, in antiphase, or shifted by 180 degrees, it is contemplated that this need not be the case in all embodiments. Indeed, in some embodiments, the antenna slots may be formed in a cyclic pattern having a series of repeated periods/phases that is shifted by some other amount relative to the series of repeated periods/phases of the waveguide ridge. However, in preferred embodiments, the series of repeated periods/phases of the plurality of antenna slots is shifted relative to the series of repeated periods/phases of the waveguide ridge such that portions of the waveguide ridge having a maximum distance from a center of the waveguide groove to the first side of the waveguide groove extend adjacent to portions of the plurality of antenna slots having a maximum distance from the center of the waveguide groove to a second side of the waveguide groove opposite the first side. In addition, in more preferred embodiments, each of the plurality of antenna slots may be aligned with a portion of the waveguide groove and each of the adjacent portions of the waveguide ridge may be positioned to maximize a distance between each respective pair of antenna slot and adjacent waveguide ridge within each of the repeated periods/phases in a direction at least substantially perpendicular to a direction in which the antenna slots and adjacent waveguide ridge extend, as shown in FIGS. 1 and 2. In other embodiments, the aforementioned distances/parameters may be close to but not fully maximal.

It should be understood that antenna assembly 100 would typically further comprises a PCB or other electromagnetic-generating element or another suitable element from which electromagnetic waves may be generated to feed one or more waveguide structures. This structure, along with various other structures that, as those of ordinary skill in the art will appreciate, may be included in a more complete depiction of a sensor or other electronic assembly, including both structures that would typically be included on antenna block 110, such as additional waveguide structures, for example, and structures that would typically be coupled to antenna block 110 to form a complete antenna assembly. Such elements are not shown in the accompanying figures, however, so as to avoid unnecessarily obscuring the inventive aspects of the disclosure.

Figure 3:
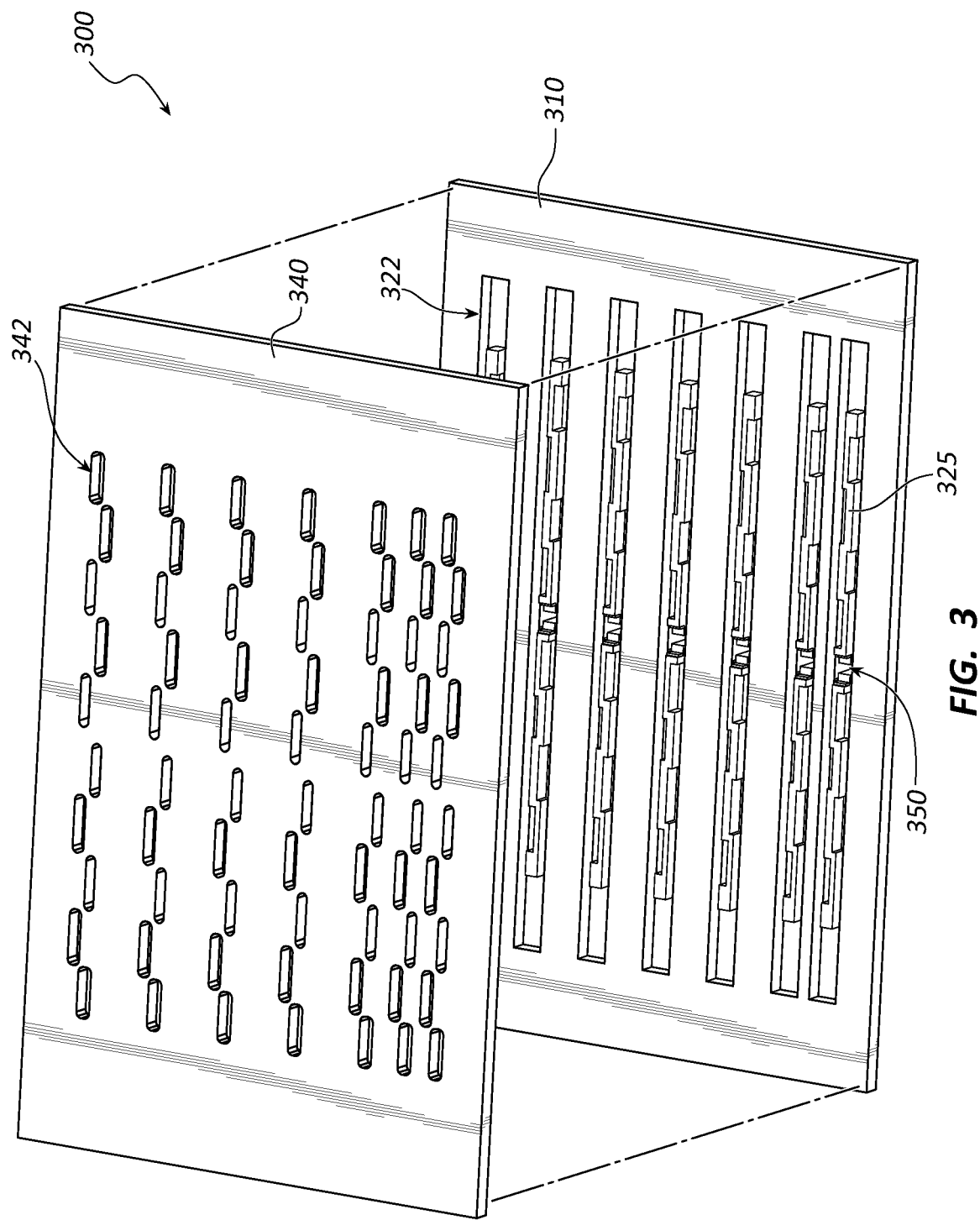
FIG. 3 is an exploded, perspective view of another waveguide assembly according to other embodiments.

FIG. 3 depicts an alternative embodiment of a portion of an antenna assembly 300 again comprising an antenna block 310 and a slotted layer 340 comprising a plurality of slots 342 through which electromagnetic energy to and/or from the waveguides defined by antenna block 310 may be delivered. However, unlike assembly 100, the waveguide grooves 322 of assembly 300 are not defined by posts. Instead, they comprise trench-like grooves that may be formed within one or more surfaces of block 310, which, as previously discussed, may comprise a die-cast piece in certain preferred embodiments.

In addition, waveguide grooves 322 are each shown with a centrally-positioned vertical tunnel or "hole" waveguide 350 extending between opposing surfaces of antenna block 310. In the depicted embodiment, waveguide 350 comprises two opposing ridges that face one another and extend from the opposing surfaces of an opening, which, again, extends between opposing surfaces of antenna block 310. These opposing ridges may, in some embodiments, be formed within this hole/tunnel form the shape of a letter "H" and may therefore be referred to as an "H-shaped" or "double-ridged" waveguide. In alternative embodiments, however, only a single ridge may be formed in this hole/tunnel, which may instead form the shape of the letter "U" or the Greek letter Π. In still other embodiments, no ridges may be formed in vertical waveguides 350.

It is contemplated that vertical waveguides 350 may be functionally coupled to another waveguide not depicted in FIG. 3, such as another horizontal and/or groove waveguide formed on the opposite side of casting/block 310. Again, this is not being shown for purposes of simplifying the disclosure but should be understood.

Otherwise, assembly 300 may be similar to assembly 100. Thus, the ridges 325 formed within waveguide grooves 322 "meander" or extend back and forth across their respective waveguide grooves 322 along opposite sides of the center of the elongated axis of each such groove 322 in the manner previously described. Similarly, each of the slots 342 of slotted layer 340 is staggered in a manner that is related to the cyclic pattern of the adjacent ridges 325. More specifically, each of the waveguide ridges 325 is positioned to extend adjacent to a side of an adjacent waveguide groove that is opposite the positioning of its adjacent staggered slot 342.

Figure 4:
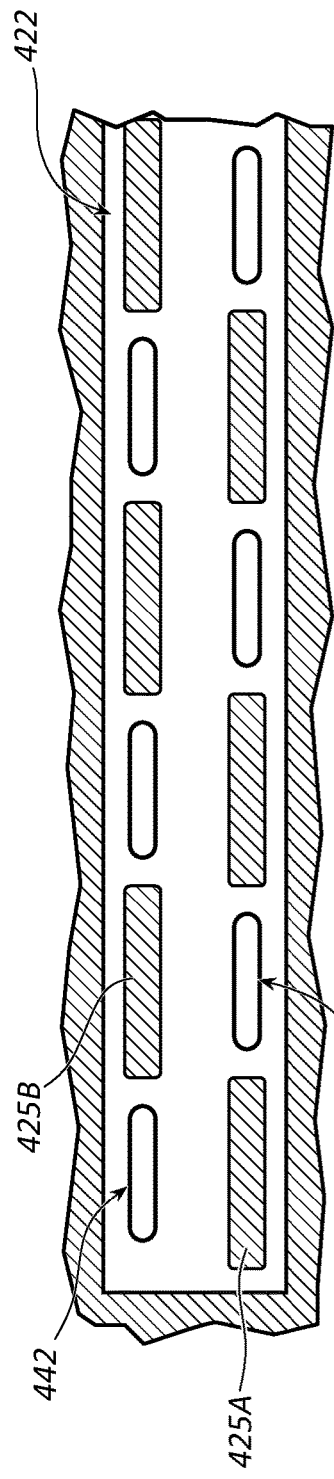
FIG. 4 depicts schematically an example of an alternative waveguide structure and associated antenna structure formed in cyclic patterns having opposite phases of a waveguide and/or antenna assembly according to some embodiments.
Figure 5:
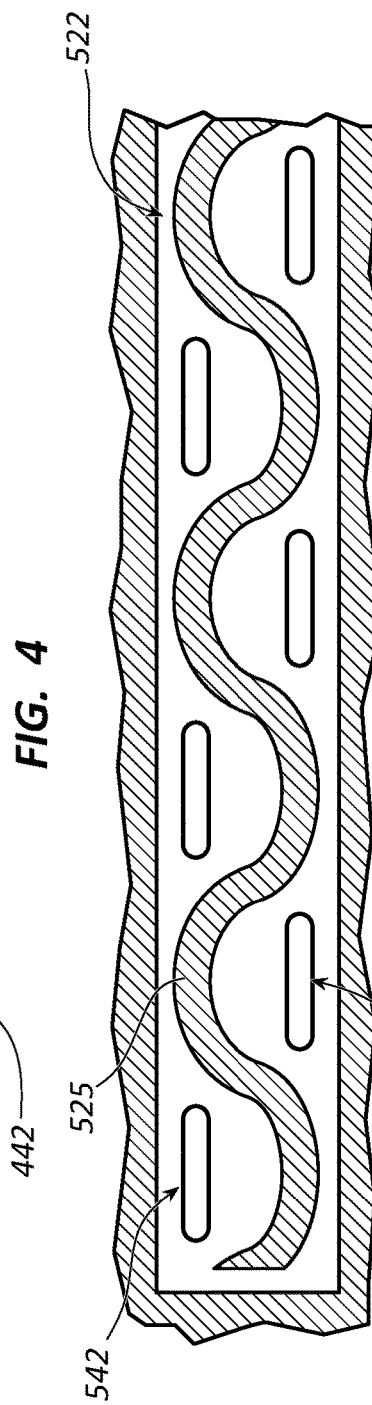
FIG. 5 depicts schematically another example of a waveguide structure formed in a sinusoidal, cyclic pattern.
Figure 6:
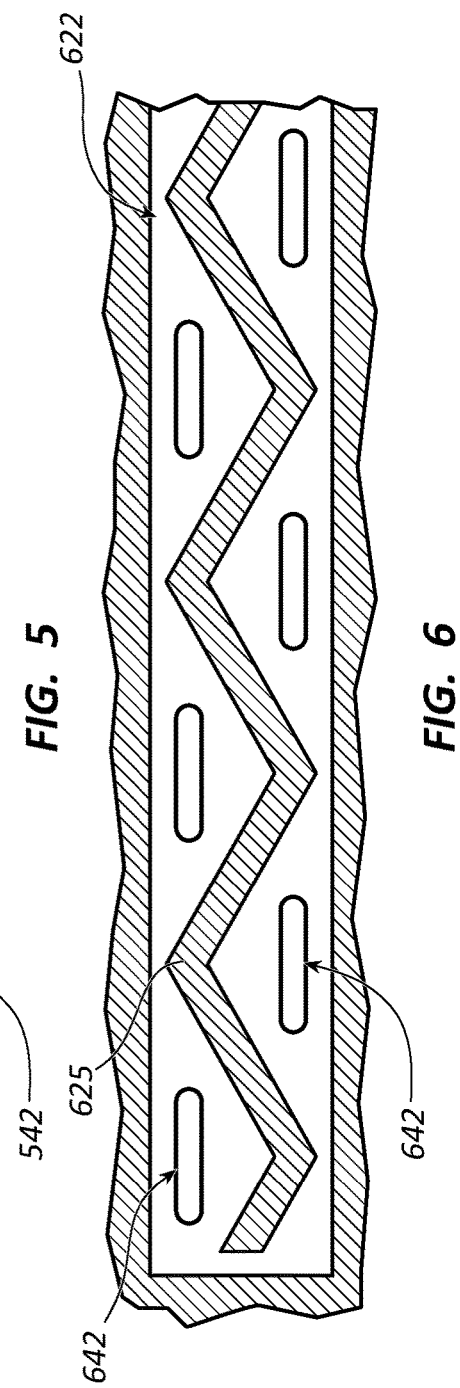
FIG. 6 depicts schematically still another example of a waveguide structure formed in a sawtooth pattern.

Additional examples of waveguide ridges are depicted in FIGS. 4-6. In FIG. 4, a waveguide groove 422 is depicted within which multiple waveguide ridge segments are positioned. Waveguide groove 422 is depicted schematically. Thus, groove 422 may be formed by, for example, forming a single trench or other groove or groove-like structure within a casting or other body, or may be formed by forming one or more rows of opposing sides to form a waveguide groove therebetween. Similarly, slots 442 may be positioned in the same structure within which waveguide groove 422 is formed, or may be formed in a separate, adjacent structure, such as an adjacent layer, as previously mentioned.

Waveguide ridge segments are positioned opposite from their adjacent slots 442. Thus, waveguide ridge segment 425A is positioned adjacent to a lower side (from the perspective of FIG. 4) of waveguide groove 422 and the adjacent slots 442 is positioned adjacent to the upper side of waveguide groove 422. Similarly, waveguide ridge segment 425B is positioned along an upper side of waveguide groove 422 and its adjacent slot 442 is positioned along the lower side of waveguide groove 422. In this manner, the "phase" or period of the repeated cycles of both the waveguide ridge formed by each of the waveguide ridge segments is opposite that of the slots 442.

In the embodiment of FIG. 5, again, a waveguide groove 522 is depicted, which may be formed in any of the aforementioned ways, or in any other manner available to those of ordinary skill in the art. A waveguide ridge 525 is positioned and extends within waveguide groove 522. Unlike the waveguide ridges previously depicted, waveguide ridge 525 extends in a periodic, sinusoidal pattern within waveguide groove 522. However, like the previous waveguide ridges discussed and depicted, waveguide ridge 525 extends in a cyclic pattern that is opposite from that of the adjacent slots 542. Thus, waveguide ridge 525 meanders or extends back and forth across the opposing sides of waveguide groove 522 such that the adjacent slots 542 extend along and/or adjacent to the adjacent "peaks" or maximum of the sinusoidal waveguide ridge 525. In this manner, the "phase" of the repeated cycles of the waveguide ridge 525 is opposite that of the corresponding slots 542. Of course, as explained elsewhere in this disclosure, in some embodiments, the pattern may not be precisely "periodic" and may still achieve one or more of the benefits described herein. For example, in some embodiments, the pattern may be quasiperiodic or at least substantially periodic so long as the variations do not unduly impact the functionality of the waveguide(s). Similarly, in other embodiments, some such benefits may be achieved by meandering the ridge back and forth without providing a cyclic, periodic, or quasi-periodic pattern. In other words, the ridge may generally extend back and forth across the waveguide groove along all, or at least a portion, of the elongated axis of the groove, but may do so in a less cyclic and/or more random manner in some embodiments.

Although the slots 542 are depicted as extending in straight lines adjacent to opposing sides of waveguide groove 522, it is also contemplated that, in alternative embodiments, slots 542 may be curved, either in whole or in part. For example, in some embodiments, the curvature of the slots 542 may be related to that of the waveguide ridge 525. For example, the slots 542 may bow outwardly towards the edge/side of the waveguide groove 522 in the opposite direction to that with which the adjacent portion of the waveguide ridge 525 extends towards the opposite edge/side of the waveguide groove 522 so as to mimic, but with the opposite phase, the cyclic pattern of the waveguide ridge 525.

Still another example of a portion of a waveguide structure is shown in FIG. 6. In this embodiment, a waveguide groove 622 is depicted, which may be formed in any of the aforementioned ways, or in any other manner available to those of ordinary skill in the art. A waveguide ridge 625 is positioned and extends within waveguide groove 622. Waveguide ridge 625 again extends in a periodic pattern, but this time the pattern is a triangular or sawtooth pattern. However, once again, waveguide ridge 625 extends in a cyclic pattern that is opposite from that of the adjacent slots 642. Thus, waveguide ridge 625 meanders or extends back and forth across the opposing sides of waveguide groove 622 such that the adjacent slots 642 extend along and/or adjacent to the adjacent "peaks" or maximum of the sawtooth waveguide ridge 625. In this manner, the "phase" or period of the repeated cycles of the waveguide ridge 625 is again opposite that of the adjacent slots 642.

Figure 7:
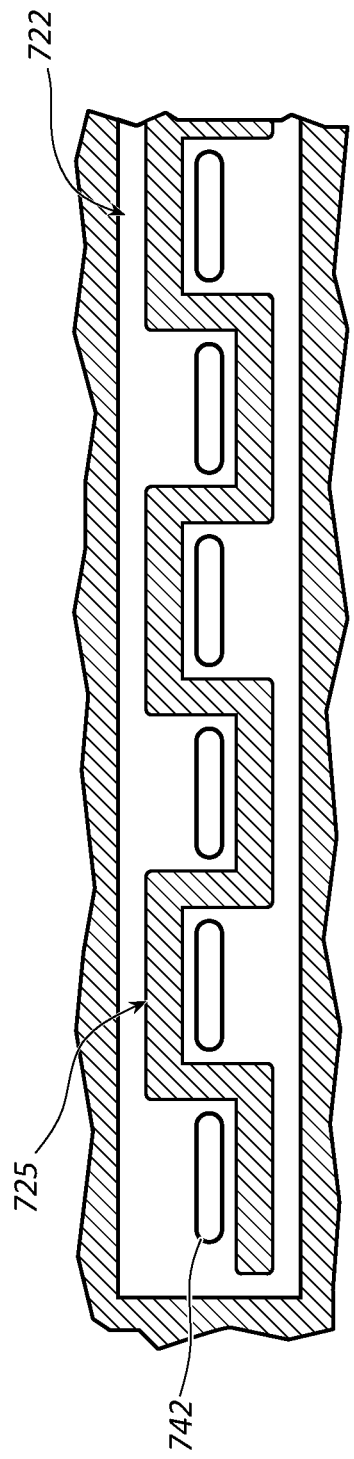
FIG. 7 depicts schematically another example of a waveguide structure comprising a meandering waveguide ridge formed in a square-wave pattern with a series of aligned slots formed in an adjacent portion of the waveguide groove.

Yet another example of a portion of a waveguide structure is shown in FIG. 7. In this embodiment, a waveguide groove 722 is depicted, which may be formed in any of the aforementioned ways, or in any other manner available to those of ordinary skill in the art. A waveguide ridge 725 is positioned and extends within waveguide groove 722.

Waveguide ridge 725 again extends in a periodic pattern (a square-wave pattern). However, the embodiment of FIG. 7 differs from the others previously depicted in that the slots 742 are aligned with one another rather than staggered relative to one another. Also, in the depicted embodiment, waveguide ridge 725 extends back and forth or "meanders" from one side of waveguide groove 722 to the other with slots 742 positioned at least substantially at a central location relative to the meandering waveguide ridge 725. In addition, each of the aligned slots 742 is misaligned with waveguide ridge 725 (i.e., no portion of the waveguide ridge 725 overlaps with any of slots 742). However, it is contemplated that, in alternative embodiments, some amount of overlap between one or more of slots 742 and a portion or portions of waveguide ridge 725 may take place. In addition, although slots 742 are aligned in the depicted embodiment, it is also contemplated that, in alternative embodiments, these slots 742 may be slightly offset and/or staggered.

As previously mentioned, although waveguide groove 722 is shown in the schematic representation as a continuous "trench-like" groove, it should be understood that it may be preferred to form waveguide groove 722 with a series of adjacent posts, as described throughout this disclosure.

Figure 8:
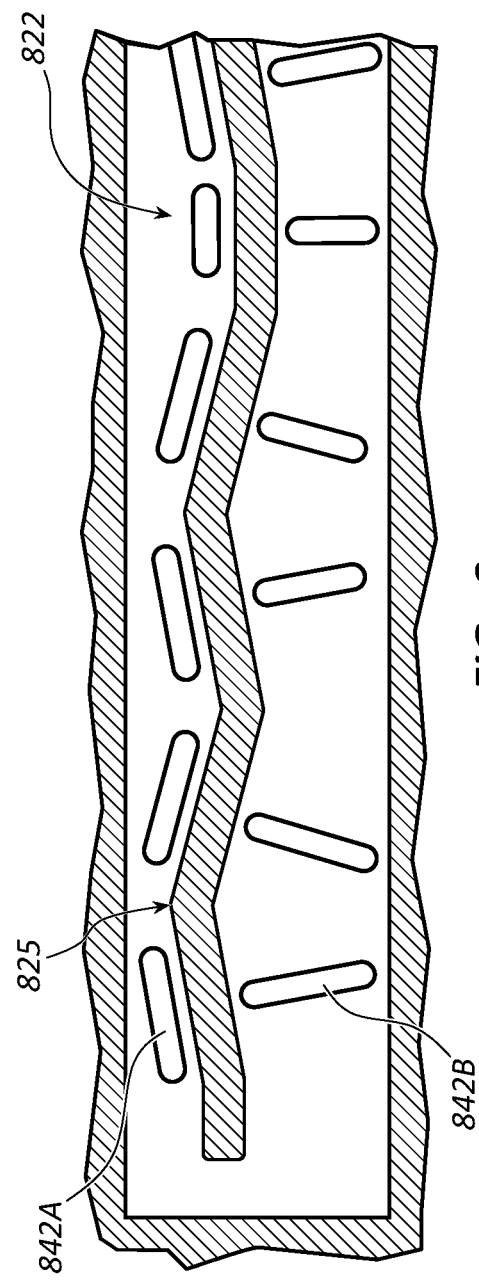
FIG. 8 depicts schematically yet another example of a waveguide structure comprising a meandering waveguide ridge formed in a quasi-periodic sawtooth pattern with radiating slots.

Another example of a portion of a waveguide structure is shown in FIG. 8. In this embodiment, a waveguide groove 822 is depicted, which may be formed in any of the aforementioned ways, or in any other manner available to those of ordinary skill in the art. A waveguide ridge 825 is positioned and extends within waveguide groove 822. Waveguide ridge 825 meanders back and forth across waveguide groove 822 along the axis of waveguide groove 822 in a quasi-periodic manner.

In addition, rather than slots extending parallel, or at least substantially parallel, to the waveguide groove 822, slots 842 comprise radiating slots formed in pairs that are configured for providing circular polarization. More particularly, for example, slots 842A and 842B extend perpendicular to one another adjacent to waveguide ridge 825. These slots may therefore provide for circular polarization of the electromagnetic energy being radiated therethrough. By providing adjacent pairs of slots that are orthogonal, or at least substantially orthogonal, to each other, two orthogonal field polarizations may be provided. In some embodiments, circularly polarized electromagnetic waves may be generated by locating the adjacent slots/slot pair such that the phases of the signals coupled to them are otherwise 90 degrees apart.

As also shown in FIG. 8, each pair of adjacent slots comprises one slot positioned on one side of waveguide ridge 825 and another slot positioned on an opposite side of waveguide ridge 825. In addition, each of the slots 842 is misaligned with waveguide ridge 825 (i.e., no portion of the waveguide ridge 825 overlaps with any of slots 842). However, it is contemplated that, in alternative embodiments, some amount of overlap between one or more of slots 842 and a portion or portions of waveguide ridge 825 may take place.

In addition, in the embodiment depicted in FIG. 8, each pair of adjacent slots 842 is angled relative to one or more adjacent pairs of slots 842. In the depicted embodiment, this angling is configured to at least substantially match or follow the angling of the adjacent ridge 825 portion. In other words, one slot 842 of each pair of slots extends parallel, or at least substantially parallel, to the adjacent portion of ridge 825, and the other slot 842 in the pair extends perpendicular, or at least substantially perpendicular, to this same adjacent ridge portion on the opposite side. Of course, a variety of alternative configurations are contemplated, however. For example, the slot pairs need not be angled relative to each other in some embodiments. As another example, the slot pairs may be positioned adjacent to bends or curves in the ridge rather than straight portions of the ridge as shown in FIG. 8. Again, although waveguide groove 822 is shown in the schematic representation as a continuous "trench-like" groove, it should be understood that it may be preferred to form waveguide groove 822 with a series of adjacent posts, as described throughout this disclosure.

Figure 9:
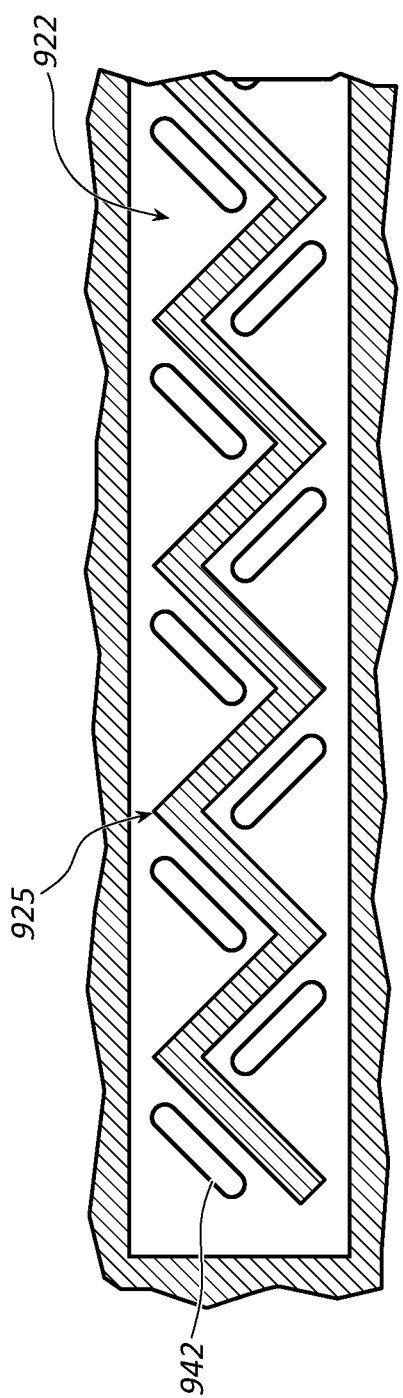
FIG. 9 depicts schematically another example of a waveguide structure comprising a meandering waveguide ridge formed in a periodic sawtooth pattern with radiating slots.

Yet another example of a portion of a waveguide structure is shown in FIG. 9. In this embodiment, another waveguide groove 922 is depicted, which may be formed in any of the aforementioned ways, or in any other manner available to those of ordinary skill in the art. A waveguide ridge 925 is positioned and extends within waveguide groove 922. Waveguide ridge 925 meanders back and forth across waveguide groove 922 along the axis of waveguide groove 922 in periodic, zig-zag or sawtooth pattern.

In addition, like the embodiment of FIG. 8, rather than slots extending parallel, or at least substantially parallel, to the waveguide groove 922, slots 942 comprise polarizing slots formed in pairs that are orthogonal, or at least substantially orthogonal, to each other. These slots again provide for circular polarization of the electromagnetic energy being radiated therethrough.

As also shown in FIG. 9, each pair of adjacent slots comprises one slot 942 positioned on one side of waveguide ridge 925 and another slot 942 positioned on an opposite side of waveguide ridge 925. In addition, each of the slots 942 is misaligned with waveguide ridge 925 (i.e., no portion of the waveguide ridge 925 overlaps with any of slots 942). However, it is contemplated that, in alternative embodiments, some amount of overlap between one or more of slots 942 and a portion or portions of waveguide ridge 925 may take place.

In addition, in the embodiment depicted in FIG. 9, each pair of adjacent slots 942 is angled relative to one or more adjacent pairs of slots 942. In the depicted embodiment, this angling is configured to at least substantially match or follow the angling of the adjacent ridge 925 portion and such that, other than the end slots 942, each slot 942 extends parallel to one adjacent ridge 925 portion and perpendicular to another adjacent ridge 925 portion. Again, a variety of alternative configurations are contemplated, however, including any of the others referenced herein.

It should also be noted that each adjacent section of ridge 925 is perpendicular (but may be at least substantially perpendicular in alternative embodiments) to one or more adjacent ridge sections. Further, each section of ridge 925 and each slot 942 extends at an angle of about 45 degrees from the central/elongated axis of waveguide groove 922. However, it is contemplated that this angle may vary slightly in alternative embodiments (for example 40-50 degrees in some embodiments) and that only one of the ridge sections or the slots may extend at this angle from the central/elongated axis in other embodiments.

Again, although waveguide groove 922 is shown in the schematic representation as a continuous "trench-like" groove, it should be understood that it may be preferred to form waveguide groove 922 with a series of adjacent posts, as described throughout this disclosure, which applies not only to each of the schematic diagrams of FIGS. 4-9 but also to any of the other embodiments depicted and/or described herein.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A waveguide assembly, comprising:
   a waveguide groove;
   a waveguide ridge positioned within the waveguide groove, wherein the waveguide groove comprises an elongated axis, and wherein the waveguide ridge intermittently extends on opposite sides of the elongated axis along the elongated axis; and
   an antenna structure operably coupled with the waveguide ridge, wherein the antenna structure is positioned and configured to deliver electromagnetic radiation from the waveguide groove therethrough.

2. The waveguide assembly of claim 1, wherein the antenna structure comprises a plurality of slots.

3. The waveguide assembly of claim 2, wherein the waveguide assembly comprises a waveguide block and an antenna layer coupled to the waveguide block, wherein the waveguide groove is formed in the waveguide block, and wherein the plurality of slots is formed in the antenna layer.

4. The waveguide assembly of claim 2, wherein the waveguide assembly comprises a waveguide block, wherein the waveguide groove is formed in the waveguide block, and wherein the plurality of slots is formed in the waveguide block.

5. The waveguide assembly of claim 1, wherein the waveguide ridge extends, at least in part, on opposite sides of the elongated axis along straight lines that are at least substantially parallel to the elongated axis in a cycle having a period, wherein the plurality of slots extends, at least in part, along the opposite sides of the elongated axis along straight lines that are at least substantially parallel to the elongated axis in a cycle having a period, and wherein the period of the plurality of slots is opposite from the period of the waveguide ridge such that each of the plurality of slots is misaligned with an adjacent portion of the waveguide ridge.

6. The waveguide assembly of claim 1, wherein the waveguide ridge extends, at least in part, on the opposite sides of the elongated axis in an at least substantially sinusoidal pattern.

7. The waveguide assembly of claim 6, wherein the plurality of posts comprises a first set of posts comprising at least two rows of posts positioned on a first side of the waveguide groove and a second set of posts comprising at least two rows of posts positioned on a second side of the waveguide groove opposite the first side.

8. The waveguide assembly of claim 1, wherein the waveguide groove is defined by a plurality of posts positioned opposite from one another in at least two rows defining the waveguide groove therebetween.

9. The waveguide assembly of claim 1, wherein the waveguide ridge extends, at least in part, on the opposite sides of the elongated axis along lines that intersect and form acute angles relative to the elongated axis and form periodic sharp peaks on the opposite sides of the elongated axis.

10. An antenna module, comprising:
    an antenna block defining a waveguide groove on a first side of the antenna block, the waveguide groove having a length extending along an axis of the waveguide groove and a width defined between opposing waveguide groove structures positioned on a first side of the waveguide groove and a second side of the waveguide groove opposite the first side;
    a waveguide ridge extending within the waveguide groove in a cyclic pattern toward the opposing waveguide groove structures, the cyclic pattern having a series of repeated periods; and
    a plurality of antenna slots positioned adjacent to the waveguide ridge and configured to deliver electromagnetic radiation from the waveguide ridge therethrough.

11. The antenna module of claim 10, wherein the opposing waveguide groove structures comprise a plurality of posts aligned in rows positioned opposite from one another.

12. The antenna module of claim 10, wherein the plurality of antenna slots is formed in a cyclic pattern having a series of repeated periods, wherein the series of repeated periods of the plurality of antenna slots is shifted relative to the series of repeated periods of the waveguide ridge such that portions of the waveguide ridge having a maximum distance from a center of the waveguide groove towards the first side of the waveguide groove extend adjacent to portions of the plurality of antenna slots having a maximum distance from the center of the waveguide groove towards the second side of the waveguide groove.

13. The antenna module of claim 12, wherein each of the plurality of antenna slots is aligned with a portion of the waveguide groove and each of the adjacent portions of the waveguide ridge is positioned to at least substantially maximize a distance between each respective pair of antenna slot and adjacent waveguide ridge within each of the repeated periods in a direction at least substantially perpendicular to a direction in which the antenna slots and adjacent waveguide ridge extend.

14. The antenna module of claim 10, wherein the waveguide ridge extends, at least in part, in an at least substantially sinusoidal cyclic pattern.

15. The antenna module of claim 14, wherein each of the plurality of antenna slots is formed adjacent to an opposite side of the waveguide groove relative to an adjacent peak of the sinusoidal cyclic pattern.

16. The antenna module of claim 15, wherein at least a subset of the plurality of antenna slots is curved.

17. The antenna module of claim 16, wherein each of the at least a subset of the plurality of antenna slots is curved in an opposite direction relative to an adjacent portion of the waveguide ridge such that each of the at least a subset of the plurality of antenna slots forms, at least in part, an at least substantially sinusoidal cyclic pattern that is shifted by 180 degrees relative to the at least substantially sinusoidal cyclic pattern of the waveguide ridge.

18. The antenna module of claim 10, wherein the waveguide ridge extends, at least in part, in square wave pattern along the axis of the waveguide groove.

19. An antenna module, comprising:
- an antenna block comprising a waveguide groove defined by opposing rows of posts;
- a waveguide ridge extending within the waveguide groove in a cyclic pattern having a series of repeated periods; and
- a slotted layer coupled to the antenna block comprising a plurality of antenna slots positioned adjacent to the waveguide groove, wherein each of the plurality of antenna slots is positioned in a cyclic pattern having a series of repeated periods, and wherein each of the repeated periods of the plurality of antenna slots is opposite a repeated period of the waveguide ridge so as to maximize a distance between each antenna slot of the plurality of antenna slots and an adjacent portion of the waveguide ridge within each of the repeated periods of the waveguide ridge in a direction perpendicular to an axis of the waveguide ridge and within a plane of the slotted layer.

20. The antenna module of claim 19, wherein the waveguide ridge is continuous.

* * * * *